US006456756B1

(12) United States Patent
Mead et al.

(10) Patent No.: US 6,456,756 B1
(45) Date of Patent: Sep. 24, 2002

(54) FIBER RAMAN AMPLIFIER PUMPED BY AN INCOHERENTLY BEAM COMBINED DIODE LASER

(75) Inventors: Roy D. Mead, Lynnwood; Dennis D. Lowenthal, Edmonds; Jason N. Farmer, Kenmore, all of WA (US)

(73) Assignee: Aculight Corporation, Bothwell, WA (US)

( * ) Notice: Subject to any disclaimer, the term of this patent is extended or adjusted under 35 U.S.C. 154(b) by 3 days.

(21) Appl. No.: 09/690,787

(22) Filed: Oct. 17, 2000

Related U.S. Application Data
(60) Provisional application No. 60/161,471, filed on Oct. 25, 1999.

(51) Int. Cl.[7] .............................. G02B 6/28; H04B 10/12
(52) U.S. Cl. .............................. 385/24; 385/31; 385/37; 385/33; 385/34; 359/334; 359/341.1; 359/345
(58) Field of Search .............................. 385/24, 31, 14, 385/37, 42, 33, 34; 372/6, 69, 102; 359/334, 341.1, 345

(56) References Cited

U.S. PATENT DOCUMENTS

| | | | | |
|---|---|---|---|---|
| 4,458,994 A | * | 7/1984 | Jain et al. ........................ 354/4 |
| 4,494,235 A | | 1/1985 | Guch, Jr. et al. ............. 372/23 |
| 4,913,525 A | | 4/1990 | Asakura et al. ......... 350/162.12 |
| 4,922,495 A | * | 5/1990 | Bobbs et al. ................... 372/3 |
| 4,923,270 A | | 5/1990 | Carter ..................... 350/96.18 |
| 5,007,698 A | | 4/1991 | Sasaki et al. ............. 350/96.15 |
| 5,052,013 A | | 9/1991 | Putnam ....................... 372/97 |
| 5,115,444 A | | 5/1992 | Kirkby et al. ................. 372/50 |
| 5,136,420 A | | 8/1992 | Inagaki et al. ............... 359/341 |
| 5,163,058 A | | 11/1992 | Farries et al. .................... 372/6 |
| 5,275,168 A | * | 1/1994 | Reintjes et al. ............. 128/665 |
| 5,276,695 A | | 1/1994 | Scheps ......................... 372/20 |
| 5,351,262 A | | 9/1994 | Poguntke et al. ............ 372/102 |

(List continued on next page.)

FOREIGN PATENT DOCUMENTS

EP 0 440 485 A2 1/1991 ........... G02B/06/34

OTHER PUBLICATIONS

M.C. Farries et al., Electronics Letters, Aug. 15, 1991, vol. 27, No. 17, pp. 1498–1499.
J.B.D. Soole et al., Electronics Letters, Sep. 10, 1992, vol. 28, No. 19, pp. 1805–1807.
J.B.D. Soole et al., Appl. Phys. Lett. 61(23), Dec. 7, 1992, pp. 2750–2752.
J.B.D. Soole et al., Appl. Phys. Lett. 58(18), May 6, 1991, pp. 1949–1951.

(List continued on next page.)

Primary Examiner—Brian Healy
(74) Attorney, Agent, or Firm—Bingham McCutchen, LLP; David G. Beck

(57) ABSTRACT

A method and apparatus for achieving broad gain bandwidth in a Raman amplifier using a wavelength multiplexed pump source is provided. The pump source offers high power, broad bandwidth, and the ability to tailor the pump spectrum, thus providing a means to achieve gain flattening within a specific band of the Raman amplifier. The pump source is preferably comprised of one or more multi-gain element arrays multiplexed together within a single external resonator cavity. Interposed between the array and the resonator cavity output coupler are a collimating element and a diffraction grating. The collimating element can be a refractive optic, a ¼ pitch GRIN lens, or a reflective optic. The diffraction grating can either be transmissive or reflective. The combination of the diffraction grating and the collimating element forces each emitter within the array to lase at a distinct wavelength. In order to achieve an overall bandwidth greater than the gain bandwidth of a single emitter array, either multiple arrays of differing center wavelength are packaged together or a large array is used with a laterally varying quantum well thickness or epitaxy. An intracavity spatial filter can be used to improve the beam quality and reduce cross-talk between emitters.

71 Claims, 8 Drawing Sheets

U.S. PATENT DOCUMENTS

| | | | | |
|---|---|---|---|---|
| 5,386,426 | A | | 1/1995 | Stephens .................... 372/20 |
| 5,390,201 | A | | 2/1995 | Tomono et al. ............... 372/22 |
| 5,450,232 | A | | 9/1995 | Sasaki et al. ............... 359/341 |
| 5,513,201 | A | | 4/1996 | Yamaguchi et al. .......... 372/75 |
| 5,541,946 | A | | 7/1996 | Scheps et al. ................ 372/23 |
| 5,773,345 | A | | 6/1998 | Ota ............................ 438/286 |
| 5,802,092 | A | | 9/1998 | Endriz ........................ 372/50 |
| 6,052,394 | A | * | 4/2000 | Lee et al. ...................... 372/6 |
| 6,340,806 | B1 | * | 1/2002 | Smart et al. ........... 219/121.62 |

OTHER PUBLICATIONS

P.F. Wysocki et al., Lucent Technologies, Bell Labs, *Erbium–Doped Fiber Amplifer Flattened Beyond 40 nm Using Long–Period Grating*, pp. PD2–1–PD2–4.

A.K. Srivastava et al., OSA TOPS on Optical Amplifiers and Their Applications, vol. 5, 1966, pp. 24–27.

A. Mori et al., NTT Opto–Electronics Laboratores, *1.5 um Broadband Amplification by Tellurite–Based EDFAs*, pp. PD1–1–PD1–4.

N. Takachio et al., OFC '98 Technical Digest, Wednesday Afternoon, WJ4, pp. 165–166.

H. Kidorf et al., IEEE Photonics Technology Letters, vol. 11, No. 5, May 1999, pp. 530–532.

H.S. Kim et al., OFC '98 Technical Digest, Wednesday Afternoon, WG4, pp. 136–138.

* cited by examiner

FIBER RAMAN AMPLIFIER PUMPED BY AN INCOHERENTLY BEAM COMBINED DIODE LASER

CROSS-REFERENCES TO RELATED APPLICATIONS

This application claims priority of provisional patent application Ser. No. 60/161,471 filed Oct. 25, 1999, the disclosure of which is incorporated herein by reference for all purposes.

FIELD OF THE INVENTION

The present invention relates generally to optical systems and, more particularly, to a method and apparatus for pumping fiber Raman amplifiers.

BACKGROUND OF THE INVENTION

Fiber optic based telecommunication networks are capable of transmitting data over several tens of kilometers without signal amplification. Transmitting data over distances greater than 100 kilometers requires that the signal be amplified. Currently, the two most popular optical amplifiers are erbium doped fiber amplifiers (EDFA's) and optical fiber amplifiers utilizing the Raman effect.

Regardless of the type of optical amplifier used in an optical network, the network's signal capacity is limited by the amplifier's spectral gain width as well as any associated gain non-uniformities. Gain non-uniformities within the utilized gain spectrum result in a non-uniform bit error rate across the network channels. Accordingly, a conventional network utilizing wavelength division multiplexing (WDM) technology requires gain flatness of approximately ±0.5 dB.

Today, the typical optical amplifier is an EDFA providing signal amplification over the bandwidth of the gain spectrum of erbium, specifically 1520 to 1560 nanometers. A telecommunication network utilizing an EDFA will transmit data on multiple wavelength channels that lie within the EDFA gain bandwidth. As the demand for data increases, however, the required data rate increases, as does the number of required wavelength channels. Since the gain bandwidth of Raman amplifiers is not intrinsically limited, optical amplifiers based on the Raman effect have recently become the focus for commercial development.

The wavelength at which a Raman amplifier provides gain is determined by the wavelength of its pump laser. Therefore, through appropriate choice of pump wavelength, Raman amplifiers can provide signal amplification for any wavelength channel within the transparency range of an optical fiber.

The principal challenge facing successful commercial deployment of Raman amplifiers is the development of an economical pump laser that provides high power, typically in the range of 1 to 3 Watts, at the desired wavelength in a diffraction limited beam. In the near term, Raman amplifiers will most likely be based on pump lasers operating in the wavelength range of 1400 to 1500 nanometers. Furthermore, due to cost, package size, and efficiency considerations, semiconductor pump lasers are the preferred technology. However, solitary diode lasers operating in the desired wavelength range are currently only capable of producing roughly 200 mW, far less than the 1 to 3 Watt requirement.

In an attempt to overcome this deficiency, WDM has been used to combine the output of several individually packaged diode pump lasers to achieve a higher power pump laser. In the WDM approach, the wavelength of each diode pump laser is controlled individually and their outputs are combined using either dispersive or dichroic optical elements. For example, H. Kidorf et al. disclose a broad bandwidth Raman amplifier utilizing 8 diode laser pumps ranging in wavelength from 1416 to 1502 in an article entitled Pump Interactions in a 100-nm Bandwidth Raman Amplifier, published in IEEE Photonics Technology Letters, vol. 11, no. 5, May 1999.

There are several drawbacks associated with a pump laser system utilizing a conventional WDM approach. First, the cost of these systems is typically quite high as each of the constituent diode lasers is individually packaged, fiber coupled, and temperature controlled. Second, as these systems require a WDM wavelength combiner each time the output from two diode lasers are combined, i.e. a four diode WDM pump requires three beam combination steps and an eight diode WDM pump requires seven beam combination steps, a conventional WDM based system rapidly becomes overly complicated and inefficient. Due to the power loss and increase in complexity that is associated with each beam combination step, increasing pump power using this brute force approach becomes untenable with more than just a handful of diode lasers.

Accordingly, what is needed in the art is a Raman optical amplifier system with a broad and relatively flat gain bandwidth. The present invention provides such a system.

SUMMARY OF THE INVENTION

The present invention provides a method and apparatus for achieving broad gain bandwidth and gain uniformity in a Raman amplifier through the use of a wavelength multiplexed pump source that outputs a high power (e.g., >1 Watt), single beam of relatively large bandwidth. The pump source of the invention, in addition to offering high power and broad bandwidth, can be tailored to provide a specific pump profile, thus providing a means to achieve gain flattening within a specific Raman gain bandwidth of the optical amplifier. As a result, a network utilizing a Raman optical amplifier, in accordance with the invention, can accommodate more channels than that achievable in a conventionally pumped system.

In at least one embodiment of the invention, the optical amplifier pump source is comprised of a multi-gain element array within an external resonator. Interposed between the array and the resonator output coupler are a collimating element and a diffraction grating. A refractive optic, a ¼ pitch GRIN lens, or a reflective optic can be used as the collimating element. The diffraction grating can either be transmissive or reflective. The combination of the diffraction grating and the collimating element forces each emitter within the array to lase at a distinct wavelength. If the gain bandwidth of a single emitter array is less than the desired bandwidth, either multiple arrays of differing center wavelength are packaged together or a large array is used with a laterally varying quantum well thickness or epitaxy. An intracavity spatial filter can be used to improve the beam quality and reduce emitter cross-talk. An external optical element can be used to condition the pump source output beam as necessary.

In at least another embodiment of the invention, the optical amplifier pump source is comprised of the outputs of a pair of multiple gain elements arrays multiplexed within a single resonator cavity. The resonator cavity is comprised of a high reflector, preferably applied to the back facets of the arrays, and an output coupler. Multiplexing can be achieved, for example, with a polarization sensitive beam combiner.

Interposed between each array and the output coupler are a collimating optic and a single diffraction grating, both of which can either be transmissive or reflective. The combination of the diffraction grating and the collimating element forces each emitter within each array to lase at a distinct wavelength. Each of the arrays are positioned relative to one another and to the diffraction grating in such a manner as to cause an interlacing of the lasing wavelengths of the individual gain elements of the two arrays. As a consequence, the wavelength separation between spectrally adjacent lasers can be further reduced as necessary to achieve the desired pump profile. Each array can be comprised of multiple arrays of differing center wavelength packaged together or of a single, large array with a laterally varying quantum well thickness or epitaxy. An intracavity spatial filter can be used to improve the beam quality and reduce emitter cross-talk. An external optical element can be used to condition the pump source output beam as necessary.

A further understanding of the nature and advantages of the present invention may be realized by reference to the remaining portions of the specification and the drawings.

DESCRIPTION OF THE SPECIFIC EMBODIMENTS

Figure 1:
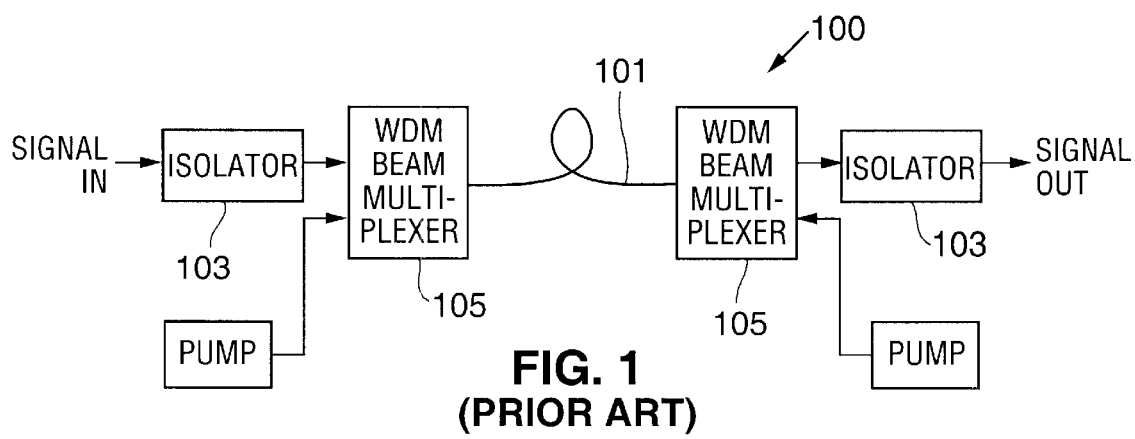
FIG. 1 schematically illustrates a portion of an optical telecommunications network.

FIG. 1 schematically illustrates a portion of an optical telecommunications network 100. This system utilizes optical fibers 101 to transmit signals over extended distances. In order to achieve the desired signal capacity, such a telecommunications system will typically utilize both wavelength division multiplexing (i.e., WDM) and time division multiplexing (i.e., TDM). As shown, the system includes isolators 103 and WDM components 105.

Associated with network 100, and more specifically with WDM components 105, are one or more optical amplifiers. Optical amplifiers, such as erbium doped fiber amplifiers (i.e., EDFA) or Raman amplifiers, are required to amplify the optical signal at various points along the path of travel in order to compensate for optical losses that occur due to absorption over long distances as well as losses that occur during the division of signals into multiple channels. Through the use of optical amplifiers, it is possible to transmit optical signals over thousands of kilometers without electrical regeneration.

Figure 2:
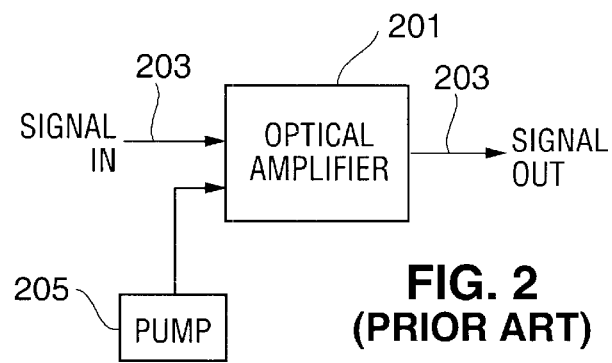
FIG. 2 schematically illustrates an optical amplifier.

As shown in FIG. 2, an optical amplifier 201 is placed within the transmission fiber 203. A pump source 205, typically a single mode diode laser in a conventional pump, supplies sufficient optical energy to amplifier 201 to allow amplification of the signal passing along fiber 203. As previously discussed, the gain medium can be the transmission fiber itself, and in this case the pump power is applied to the transmission fiber through a WDM coupler.

Figure 3:
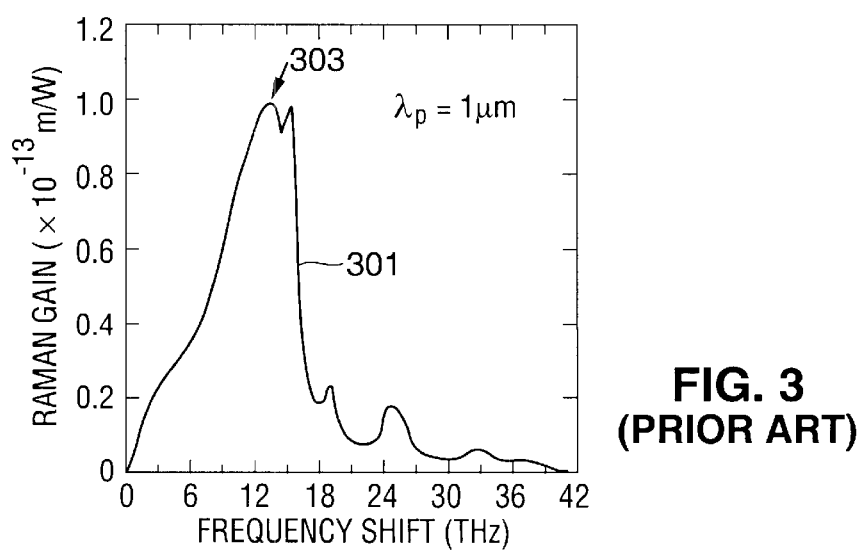
FIG. 3 is an illustration of the Raman gain profile in fused silica.

FIG. 3 is an illustration of the Raman gain profile 301 in fused silica. In this example a pump wavelength of 1 micron is assumed. A peak 303 of gain profile 301 is shifted to the red side of the pump wavelength by approximately 13 THz. The gain bandwidth of profile 301, which is equivalent to the full width measured at the half maximum, is approximately 6 THz.

In order to achieve more uniform gain and greater bandwidth, a pump source with a spectrally tailored bandwidth is required. A very simple approach to determining the overall system gain spectrum, $g_s(\omega)$, is the convolution of the Raman gain spectrum, $g_{fs}(\omega)$, with the pump emission spectrum, $I_p(\omega)$:

$$g_s(\omega) = \int g_{fs}(\omega) I_p(\omega - v) dv$$

The equation above assumes that there is no self-amplification of the pump or signal waves or higher-order effects, and the pump is only applied in the forward direction. In actuality, self-amplification is a significant factor in Raman amplifiers. Self-amplification occurs when the bandwidth of the pump is comparable to or greater than the Raman shift since in this case the wavelengths to the red end of the pump spectrum will experience gain induced in the fiber from the wavelengths to the blue end of the pump spectrum. Self-amplification tends to increase the system gain for the red input wavelengths, but can be compensated for by weighting the shape of the pump emission spectrum towards the blue. A detailed discussion and model for these phenomena are give by Kidorf et al. (Ibid.).

A simplified model for the transfer of power among the various wavelengths in the fiber can be described by the system of equations, $$\frac{\partial I_f(z, \omega)}{dz} = -\alpha I_f(z, \omega) + \int_{v<\omega} g(\omega - v)[I_f(z, \omega) + I_b(z, \omega)] dv - \int_{v>\omega} g(\omega - v)[I_f(z, \omega) + I_b(z, \omega)] dv,$$

where the forward intensity $I_f$ is modeled as a function of the distance z along the fiber, at various frequencies $\omega$. Attenuation is represented by $\alpha$, while g represents the Raman gain profile. This model includes the effects of back-propagating intensity $I_b$, but for simplicity does not include spontaneous Raman emission or Rayleigh scattering. The actual intensities in the fiber reflect the transfer of power not only from the pump waves to the signal waves, but also from the shorter-wavelength pump waves to the longer-wavelength pump waves. Ultimately the gain spectrum is determined by the equilibrium values of the intensities at all wavelengths, coupled by the Raman interaction.

It is understood that it is desirable to achieve a wide and uniform gain bandwidth in an optical amplifier that is to be used in a telecommunications network as this provides greater signal capacity and thus the ability for the network to accommodate more channels. As is apparent from the above discussion, one method for achieving greater bandwidth is to use pump lasers which exhibit greater bandwidth. Unfortunately most conventional pump sources (e.g., Fabry-Perot cavity diode lasers, distributed feedback diode lasers, or fiber lasers) have a relatively narrow bandwidth, on the order of a few THz at most. Therefore such a source will yield a system gain bandwidth, $g_s(\omega)$, which is barely greater than the Raman gain bandwidth of fused silica.

One technique to achieve greater pump bandwidth is to use multiple discrete diode pump sources. This technique, however, dramatically increases the pump system complexity due to the inclusion of multiple beam combiners and/or multiplexers which are required to merge the individual outputs from the multiple diode lasers. Furthermore, as shown by Kidorf et al. (Ibid.), it is difficult to achieve the desired gain flatness using a reasonable number of discrete pump lasers.

Figure 4:
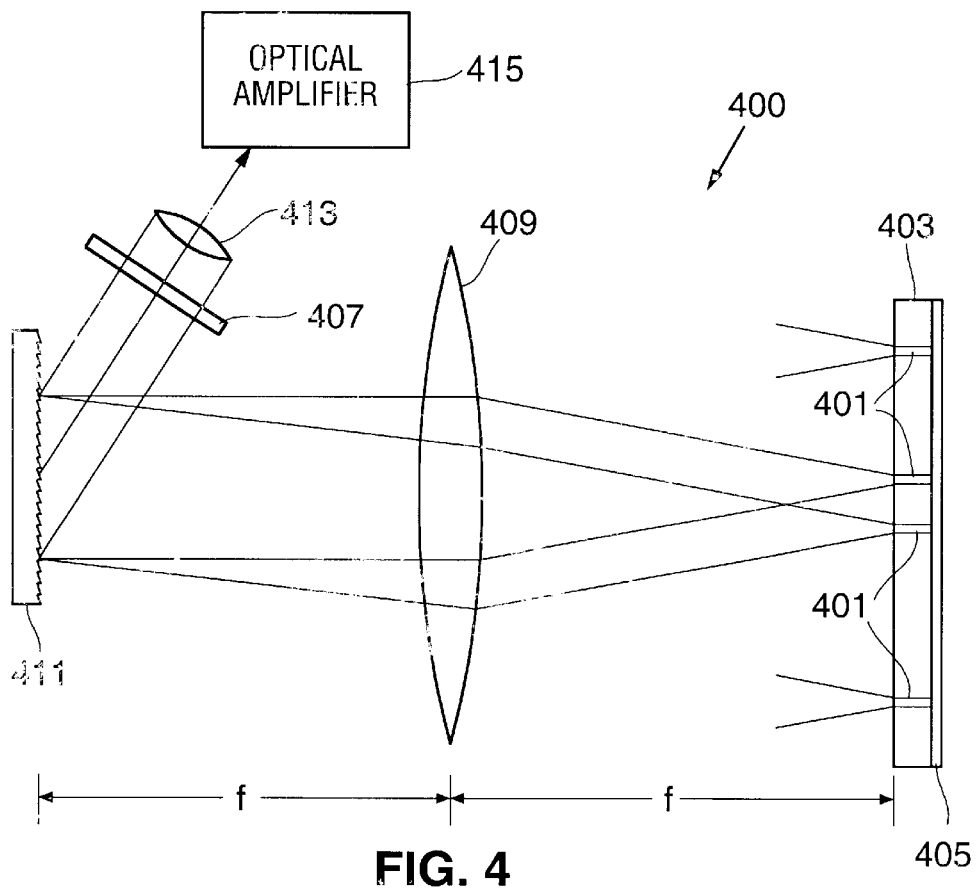
FIG. 4 schematically illustrates an IBC laser coupled to an optical amplifier.

According to the invention, the desired pump bandwidth is achieved through the use of an incoherently beam combined (i.e., IBC) laser as the pump source, the IBC laser providing a single output beam of the desired power, bandwidth, and spectral shape without resorting to individual pump diodes. One embodiment of an IBC laser is schematically illustrated in FIG. 4. As shown, the output from a plurality of single mode diode emitters 401, typically contained within a single diode bar 403, are coupled to an external resonator cavity comprised of a high reflectance coating 405, preferably applied to the back facets of emitters 401, and an output coupler 407. Interposed between emitters 401 and output coupler 407 are a collimating optic 409 and a diffractive element 411. Typically one or more optical elements 413 are used to couple the output from the resonator cavity into optical amplifier 415.

One benefit of the present invention is that it provides a means of achieving high power in a broad bandwidth source. The bandwidth of IBC system 400 is achieved by operating each individual emitter 401 at a different wavelength. An additional benefit of the invention is that it allows the pump power across the bandwidth of the device to be tailored, for example by controlling the density of emitters within predetermined wavelength regions. By tailoring the pump profile, the gain profile of the optical amplifier can be substantially flattened within a specific band. The present invention can be used to compensate for the effects of pump self-amplification by controlling the emitter spacing, for example by spacing the emitters closer together at the blue end of the spectrum and spacing the emitters further apart at the red end of the spectrum.

Figure 5:
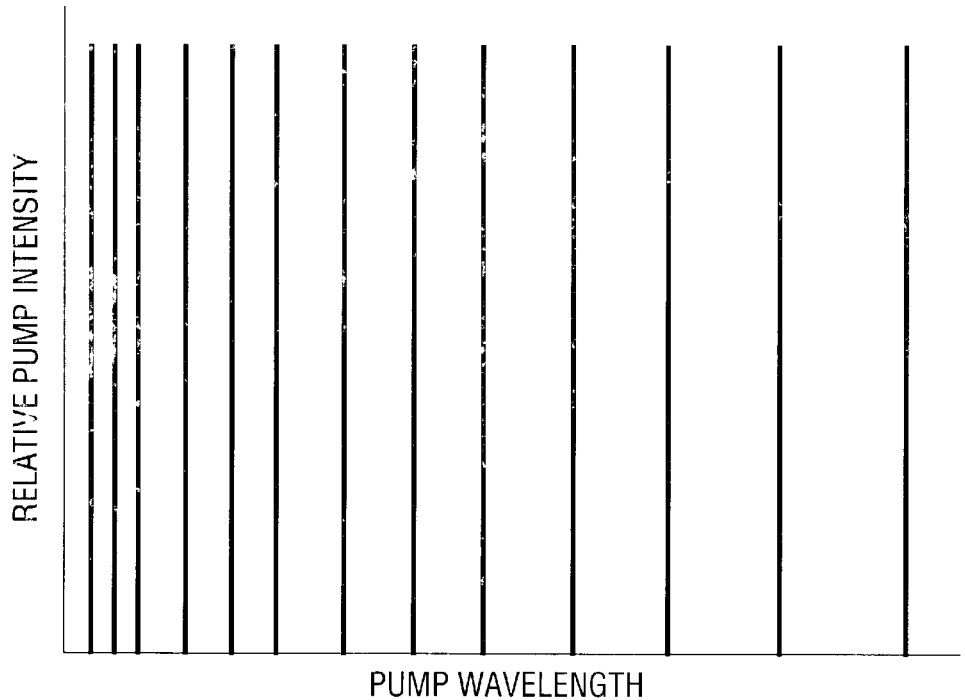
FIG. 5 is an illustration of a pump profile for a specific embodiment of the invention.
Figure 6:
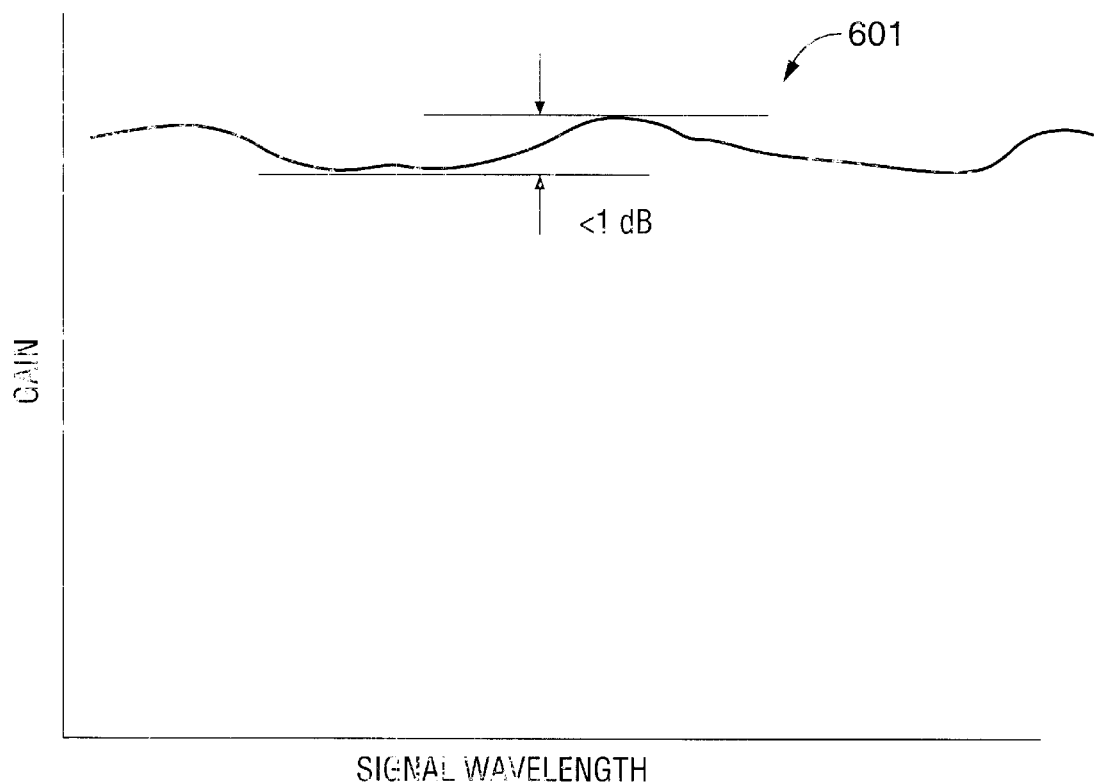
FIG. 6 is an illustration of the system gain profile for an optical amplifier utilizing the pump profile shown in FIG. 5.

FIGS. 5 and 6 illustrate the concept of selecting a specific pump spectrum (i.e., FIG. 5) in order to achieve a desired system gain spectrum (i.e., FIG. 6). As shown, due to the wavelength spacing as well as the relative output powers of the selected emitters, the system gain spectrum 601 has a substantially flat gain profile over 100 nanometer bandwidth. It is understood that FIGS. 5 and 6 are only illustrative of one embodiment of the invention as the specific pump spectrum depends upon such factors as the intended gain medium and the desired system gain profile. For example, the optical amplifier can be fabricated from a material other than fused silica (e.g., germinate based fibers, tellurite based fibers, fluoride based fibers, and ZBLAN fibers etc.) and therefore will exhibit a different Raman shift and bandwidth.

If desired, the gain deviations around the mean can be minimized by systematic variation of the pump emitter spacings. It is most convenient in this case to represent the pump emitter spacings by a multiparameter function that varies with position. The model for gain can be run while varying the parameters of the function describing the emitter spacings and the parameters iterated until a minimum in the gain variations is reached.

Figure 7:
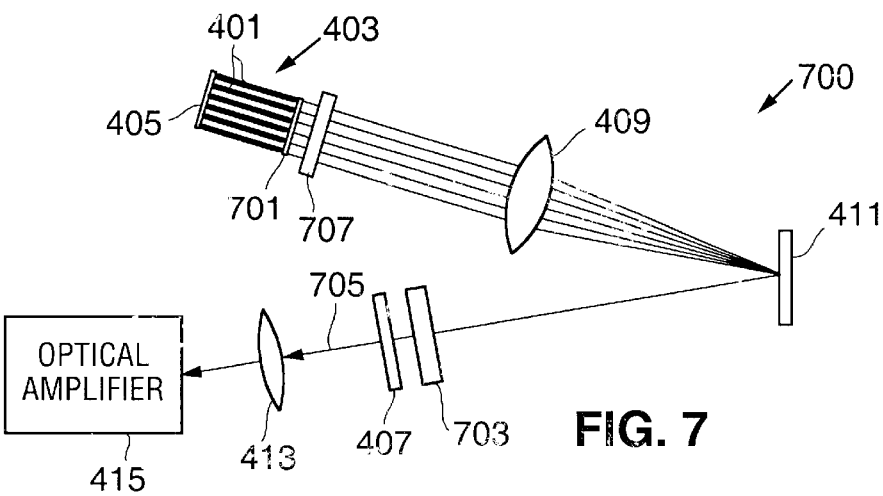
FIG. 7 schematically illustrates an optical amplifier coupled to an IBC laser utilizing a multi-element array, an intracavity transmissive collimating optical element, and an intracavity reflective diffraction grating.

FIG. 7 schematically illustrates a laser system 700 in accordance with the invention, similar to the embodiment shown in FIG. 4. It is understood that FIG. 7 is not an accurate ray tracing schematic, but is merely intended to represent the relationship of the various elements of system 700. As in system 400, laser system 700 includes laser gain element array 403 comprised of a plurality of emitters 401, reflector 405 (preferably a high reflection coating applied to the back facets of array 403), output coupler 407, collimating lens 409, and diffraction grating 411. External to the resonator cavity is optical amplifier 415.

Collimating lens 409 serves two purposes. First, lens 409 collimates the light from individual gain elements 401. Second, lens 409 causes the light from individual gain elements 401 to be spatially overlapped onto diffraction grating 411, assuming that the distance separating grating 411 from lens 409 is equal to or greater than the focal length of element 409. In the preferred embodiment, the distance separating grating 411 and lens 409 is substantially equivalent to the focal length of lens 409 as is the distance separating array 403 from lens 409.

Due to the disclosed laser system configuration in which the feedback path of the individual emitters includes the combination of diffraction grating 411 and lens 409, each emitter in array 403 is forced to lase at a distinct wavelength. The wavelength at which each emitter is forced to lase is determined by the grating equation, the cavity geometry, and the emitter structure of array 403. The grating equation is given by:

$$\text{Sin}(\theta_{incident} + n\Delta\theta) + \text{Sin}(\theta_{out}) = \frac{m\lambda_n}{d},$$

where $\lambda_n$ is the wavelength of the nth emitter of array 403, m the diffraction order, d the grating ruled spacing, $\theta_{incident}$ the incident angle of each beam at the grating, and $\theta_{out}$ the common output angle for each beam. The wavelength shift between adjacent emitters is then $$\Delta\lambda = \frac{sd\text{Cos}(\theta_{incident})}{f},$$

where s is the separation between emitters and f is the focal length of intracavity lens 409.

It is understood that active elements 401 can either be single mode or multi-mode gain elements. The benefit of using multi-mode gain elements is that a flatter emission spectrum is typically easier to achieve than it is using single transverse mode elements due to the improved fill factor associated with the multi-mode elements. Array 403 can be comprised of a semiconductor diode laser array, a stack of side or end pumped solid state laser materials, or a fiber laser array. Suitable solid state laser materials include, but are not limited to, alexandrite, $CO:MgF_2$, and Cr:LiSAF.

Since the physical spacing between emitters controls the wavelength shift between adjacent emitters, one of the primary considerations in selecting the emitters comprising array 403 is the emitter spacing. As previously noted, the selection of emitters 401 is based on the desired system gain spectrum as well as the Raman gain spectrum of the optical amplifier. If closely spaced emitters are required in order to achieve the desired pump spectrum, index guided arrays can be used, i.e., arrays in which individual emitters are optically isolated from one another using a boxcar lateral index profile. If the desired bandwidth is greater than that achievable with a single emitter array, multiple individual arrays can be packaged together, each individual array having a distinct center wavelength. Alternately, a large array can be used with a laterally varying quantum well thickness or epitaxy, thus achieving a wavelength gradient across the array.

In the preferred embodiment, an anti-reflection (i.e., AR) coating is applied to front facets 701 of array 403. AR coating facets 701 reduces the optical losses within system 700.

In at least one embodiment of the invention, laser system 700 includes a spatial filter 703 in order to improve beam quality and reduce emitter cross-talk. Preferably spatial filter 703 is interposed between grating 411 and output coupler 407. For example, spatial filter 703 can be comprised of an aperture or a combination of an aperture and a lens, the aperture located at the image plane of the gain elements. Preferably the aperture of spatial filter 703 is smaller than the image of an individual gain element, thus improving the beam quality of emitted beam 705. If the aperture size is sufficiently small, the beam quality will approach the diffraction limit.

In another alternate embodiment, laser system 700 includes an additional optical element 707 positioned adjacent to the emitting facets of array 403. Due to the rapidly diverging, astigmatic nature of the emissions from active elements 401, optical element 707 can be used to reduce the divergence, thus allowing a reduction in the size of the optics which follow element 707, e.g., lens 409. In addition, laser system 700 is less aberration sensitive due to the inclusion of optical element 707.

Optical element 707 can be comprised of a single lens or a plurality of lens elements. For example, lens 707 can be comprised of a fast cylindrical lens that reduces the divergence of the light emitted by diode emitters 401 in the fast axis while having negligible impact on the divergence of the light in the slow axis. Alternately, as opposed to a single cylindrical lens, optical element 707 can be a lens array comprised of a plurality of individual lens elements, wherein there is a one-to-one correspondence of the individual lens elements and the emitters. Such a lens array can be fabricated using a variety of techniques, such as photolithography. Alternately, optical element 707 can be comprised of a fast cylindrical lens in combination with a lens array, the lens array comprised of a plurality of individual cylindrical lenses with a center-to-center spacing matching that of emitters 401. In this design the fast cylindrical lens reduces the divergence of the light emitted by elements 401 in the fast axis while the lens array reduces the divergence of the light emitted by elements 401 in the slow axis. Alternately, optical element 707 can be comprised of an array of lens elements, each of which is an aspheric lens having a different focal length in the slow and fast axes.

Figure 8:
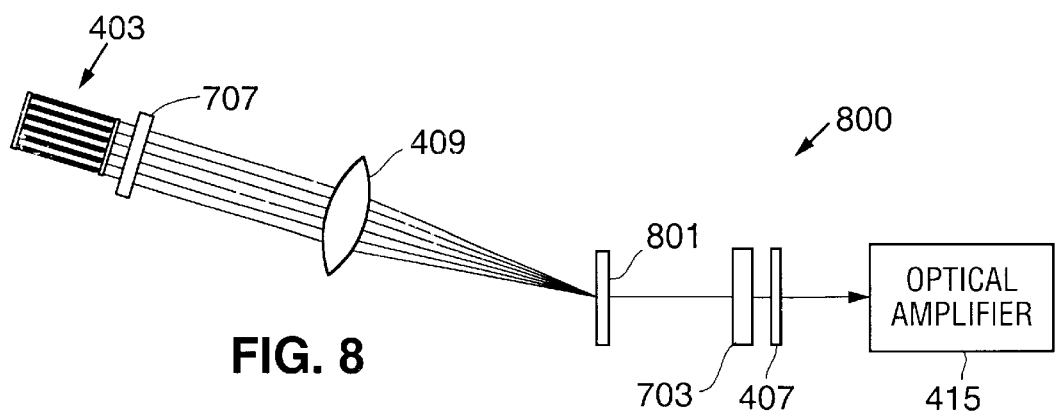
FIG. 8 schematically illustrates an optical amplifier coupled to an IBC laser utilizing a multi-element array, an intracavity transmissive collimating optical element, and an intracavity transmissive diffraction grating.
Figure 9:
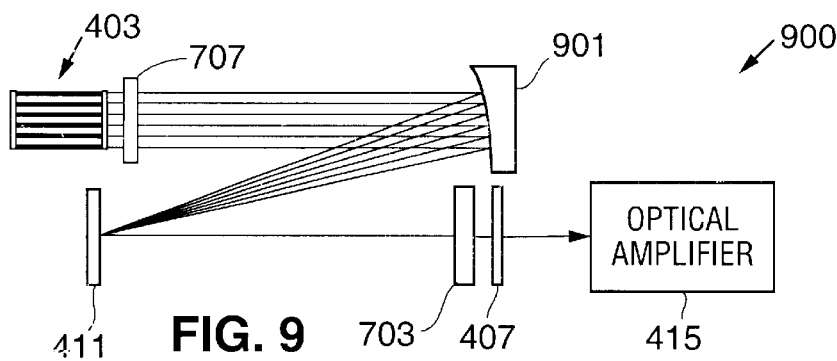
FIG. 9 schematically illustrates an optical amplifier coupled to an IBC laser utilizing a multi-element array, an intracavity reflective collimating optical element, and an intracavity reflective diffraction grating.
Figure 10:
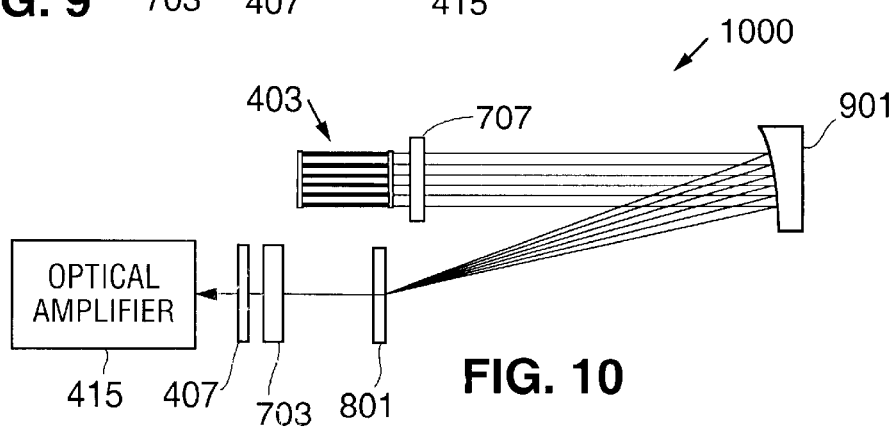
FIG. 10 schematically illustrates an optical amplifier coupled to an IBC laser utilizing a multi-element array, an intracavity reflective collimating optical element, and an intracavity transmissive diffraction grating.
Figure 11:
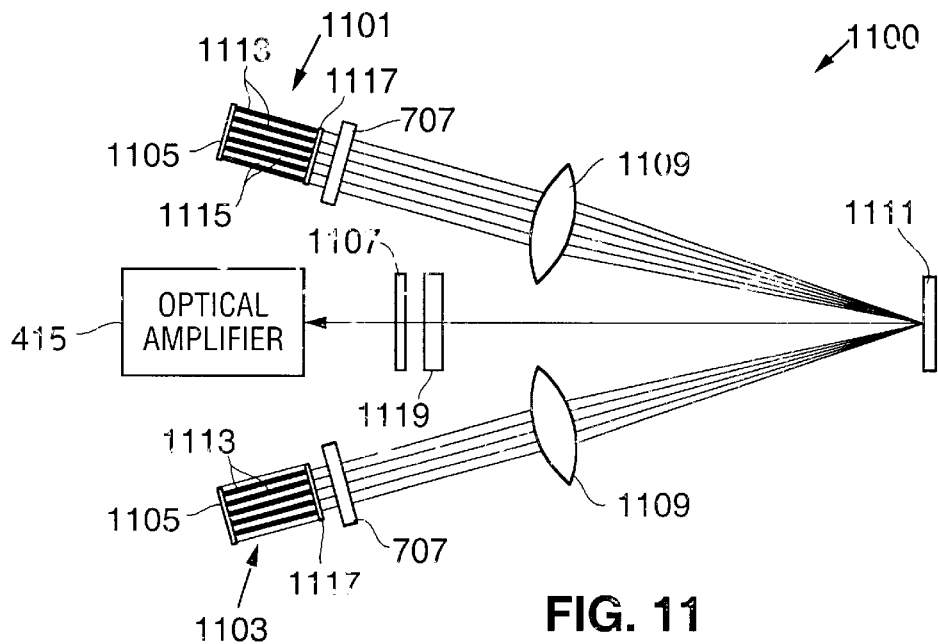
FIG. 11 schematically illustrates an optical amplifier coupled to an IBC laser utilizing a pair of multi-element arrays, a pair of intracavity transmissive collimating optical elements, and an intracavity reflective diffraction grating.
Figure 12:
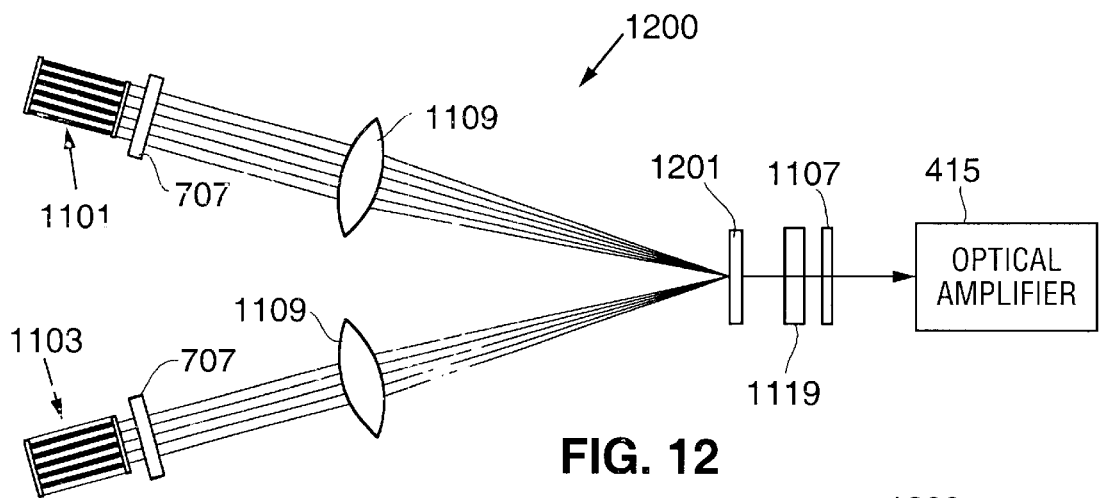
FIG. 12 schematically illustrates an optical amplifier coupled to an IBC laser utilizing a pair of multi-element arrays, a pair of intracavity transmissive collimating optical elements, and an intracavity transmissive diffraction grating.
Figure 13:
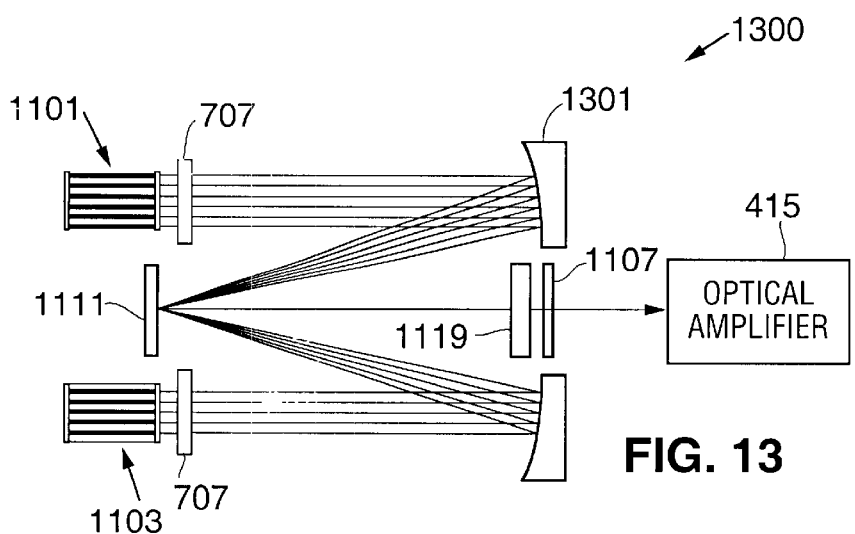
FIG. 13 schematically illustrates an optical amplifier coupled to an IBC laser utilizing a pair of multi-element arrays, a pair of intracavity reflective collimating optical elements, and an intracavity reflective diffraction grating.
Figure 14:
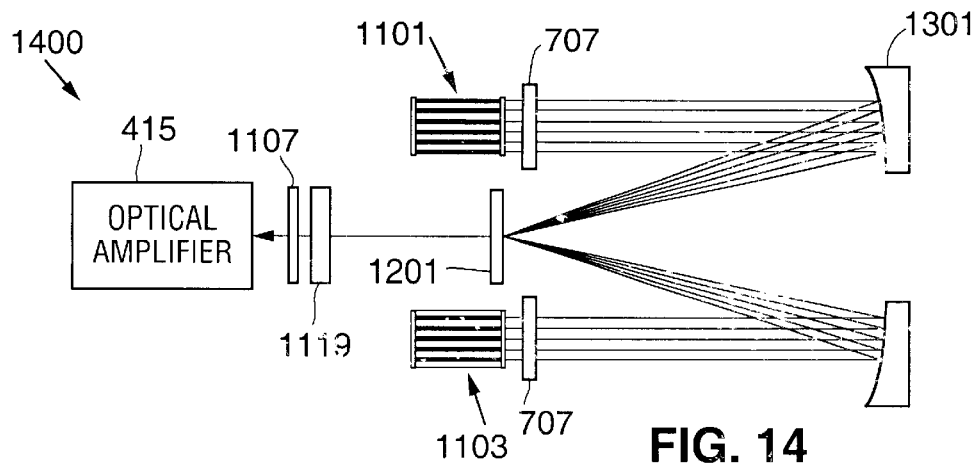
FIG. 14 schematically illustrates an optical amplifier coupled to an IBC laser utilizing a pair of multi-element arrays, a pair of intracavity reflective collimating optical elements, and an intracavity transmissive diffraction grating.

FIGS. 8–10 illustrate other embodiments of the invention. Specifically, systems 800–1000 are identical to system 700 except system 800 utilizes a transmissive diffraction grating 801; system 900 utilizes a reflective collimating optic 901; and system 1000 utilizes both transmissive grating 801 and reflective collimating optic 901. Although not shown, each of these embodiments can also be configured to utilize one or more external optical elements 413 to shape the output beam.

FIGS. 11–14 illustrate a technique for combining the output from multiple arrays within a single resonator cavity, thereby achieving a compact, stable, and robust optical system for pumping optical amplifier 415. These systems provide a means for easily achieving greater output power, greater bandwidth, and closer emitter spacing than that achievable with systems 700–1000. In each of the illustrated systems, the outputs from a pair of gain element arrays 1101 and 1103 are combined utilizing a single external resonator cavity, the resonator cavity being comprised of a reflector 1105, preferably a high reflection coating applied to the back facets of arrays 1101 and 1 103, and an output coupler 1 107. Interposed between each array and output coupler 1107 are a collimating optic and a single diffraction grating. The collimating optic can either be refractive, e.g., optic 1109, or reflective, e.g., optic 1301. Similarly, the diffraction grating can either be reflective, e.g., grating 1111, or transmissive, e.g., grating 1201.

It is understood that the IBC systems of the present invention can be used to provide a virtually continuous spectrum in a specific band. For example, arrays 1101 and 1103 can be designed so that they each have a 50 percent duty cycle. In other words, the widths associated with active gain elements 1113 are substantially equivalent to the widths associated with the non-active, i.e., non-light emitting regions 1115. Array 1101 is positioned relative to diffraction grating 1111, and preferably to the positive first order of diffraction grating 1111, such that a first active element resonates wavelengths from $\lambda$ to $\lambda+\Delta\lambda$, a second active element resonates wavelengths from $\lambda+2\Delta\lambda$ to $\lambda+3\Delta\lambda$, and a $n^{th}$ element resonates wavelengths from $\lambda+(2n-2)\Delta\lambda$ to $\lambda+(2n-1)\Delta\lambda$. In order to achieve a substantially continuous output wavelength spectrum, array 1103 is positioned relative to diffraction grating 1111, and preferably to the negative first order of diffraction grating 1111, such that a first active element resonates wavelengths from $\lambda+\Delta\lambda$, to $\lambda+2\Delta\lambda$, a second active element resonates wavelengths from $\lambda+3\Delta\lambda$ to $\lambda+4\Delta\lambda$, and a $n^{th}$ element resonates wavelengths from $\lambda+(2n-1)\Delta\lambda$ to $\lambda+(2n)\Delta\lambda$. As a result, the output spectrum of system 1100 is substantially spectrally continuous from $\lambda$ to $\lambda+(2n)\Delta\lambda$.

It is understood that although the arrays in the above example utilize 50 percent duty cycles, other duty cycles can be utilized. In addition, it is not necessary that the systems be designed to output a continuous output spectrum.

As in the previous embodiments, systems 1100–1400 provide the required pump spectrum for optical amplifier 415. Additionally, and as previously discussed, preferably each of these systems also includes an AR coating 1117 on the front facets of arrays 1101 and 1103, a spatial filter 1119 interposed between the diffraction grating and output coupler 1107, and an optical element 707 interposed between each of the arrays and the corresponding collimating optics. Furthermore, each of these embodiments can also be configured to utilize one or more external optical elements 413 (not shown) to further condition the output beam.

Figure 15:
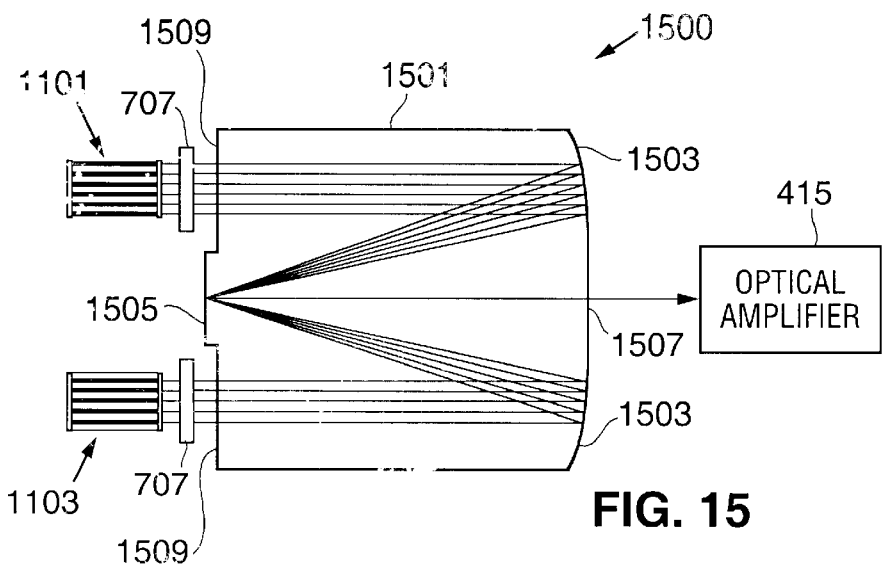
FIG. 15 schematically illustrates an optical amplifier coupled to an IBC laser utilizing a pair of multi-element arrays and a monolithic cavity design.

FIG. 15 is an illustration of an alternate laser system 1500 that is similar to system 1300 except for the use of a monolithic cavity design. Preferably monolithic element 1501 is comprised of a single material which is substantially transparent to the wavelengths of interest. After shaping, a reflective coating is applied to surfaces 1503, resulting in a mirrored surface that collimates the light from the individual array gain elements. Monolithic element 1501 also includes a reflective diffraction grating 1505 which can be fabricated onto the desired surface of element 1501 using any of a variety of known techniques. A suitable partially reflective coating is applied to surface 1507, this surface acting as the output coupler of the resonator cavity. In order to minimize optical losses of laser system 1500, preferably surfaces 1509 are AR coated.

In the preferred embodiment of laser system 1500, arrays 1101 and 1103 are bonded to monolithic element 1501 using an optically transparent adhesive, thus achieving a very robust optical system. If desired, an optical element such as a previously described element 707 can be interposed between arrays 1101 and 1103 and monolithic element 1501. Although optical element 707 can be ground into the surface of monolithic element 1501, preferably element 707 is separately fabricated and then bonded to element 1501 using optically transparent adhesive.

FIGS. 16–19 illustrate a variety of embodiments of the invention that utilize a beam combining element 1601. Due to the use of element 1601, these embodiments do not utilize both the positive and negative orders of the grating, thus reducing cross-talk. As illustrated, the emissions from arrays 1101 and 1103 are combined using beam combining element 1601 prior to collimating the emissions onto the grating. Preferably beam combining element 1601 is a polarization sensitive beam combiner, such as a thin film polarizer. The output from one array, e.g., array 1101 in FIGS. 16–19, passes through a wave plate 1603 prior to impinging on the polarization sensitive beam combiner 1601. As a consequence, the output of array 1101 is reflected by element 1601 while the output from array 1103 is transmitted by element 1601. Either a reflective element 1605 or a transmissive element 1701 collimates the array emissions onto the diffraction grating. Depending upon the desired configuration, the diffraction grating can either be reflective, as in grating 1607, or transmissive, as in grating 1703. The embodiments shown in FIGS. 16–19 can also include spatial filter 1119 as previously shown and described relative to FIG. 11 and/or optical elements 707 and 413 as previously shown and described relative to FIG. 7.

Figure 16:
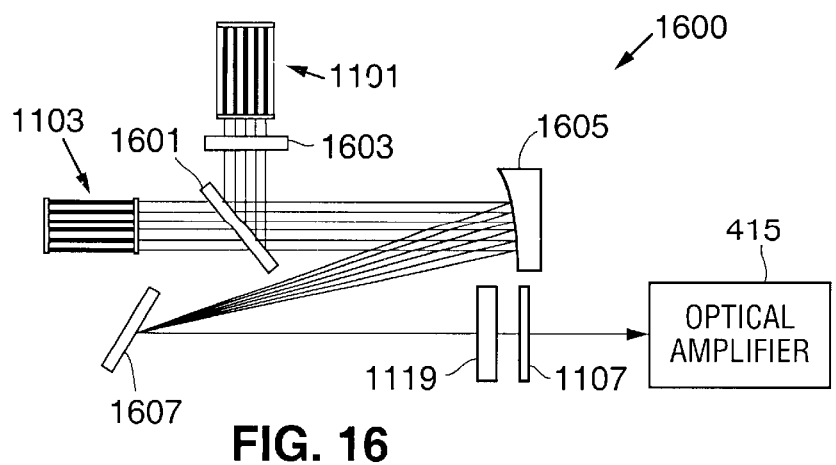
FIG. 16 schematically illustrates an optical amplifier coupled to an IBC laser utilizing polarization multiplexing, a reflective collimating element, and a reflective diffraction grating.
Figure 17:
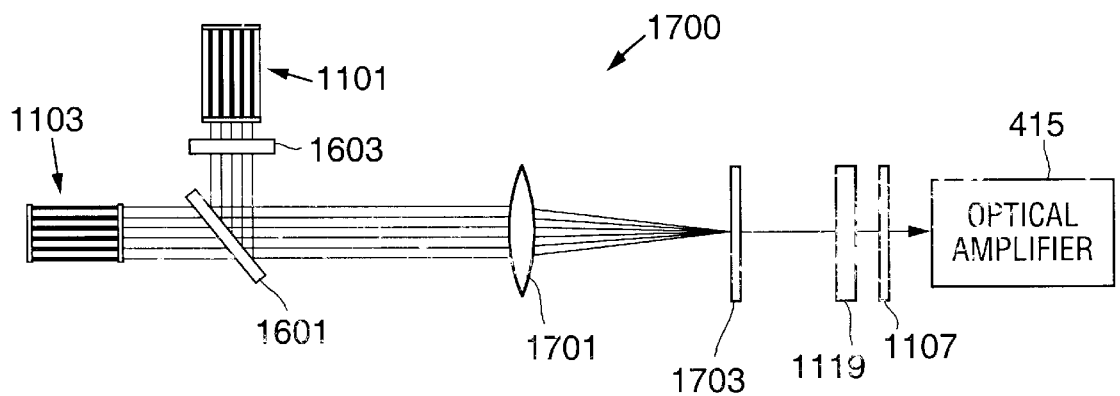
FIG. 17 schematically illustrates an optical amplifier coupled to an IBC laser utilizing polarization multiplexing, a transmissive collimating element, and a transmissive diffraction grating.
Figure 18:
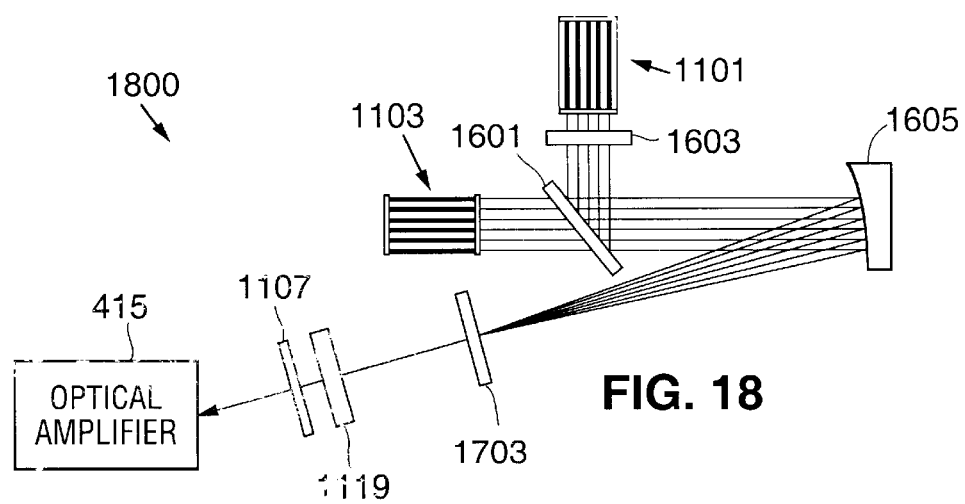
FIG. 18 schematically illustrates an optical amplifier coupled to an IBC laser utilizing polarization multiplexing, a reflective collimating element, and a transmissive diffraction grating.
Figure 19:
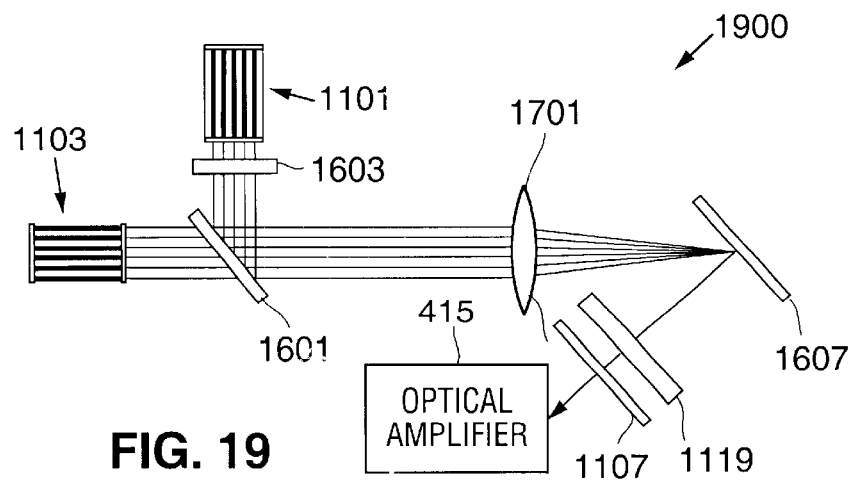
FIG. 19 schematically illustrates an optical amplifier coupled to an IBC laser utilizing polarization multiplexing, a transmissive collimating element, and a reflective diffraction grating.
Figure 20:
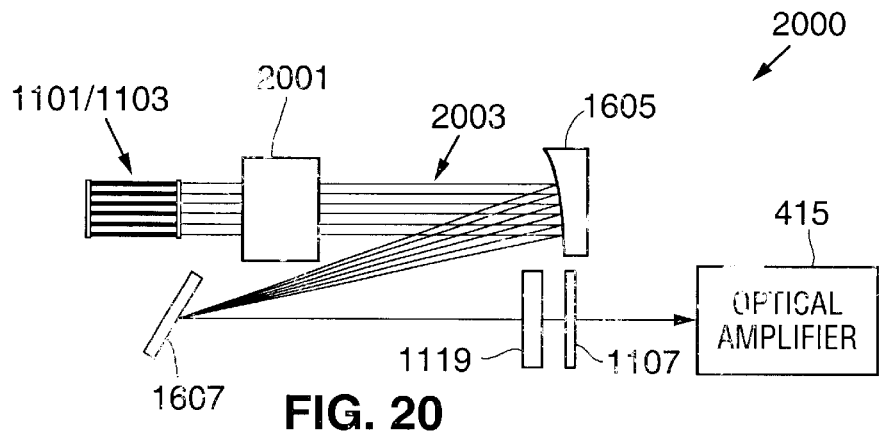
FIG. 20 schematically illustrates an optical amplifier coupled to an IBC laser utilizing polarization multiplexing, a birefringent crystal, a reflective collimating element, and a reflective diffraction grating.
Figure 21:
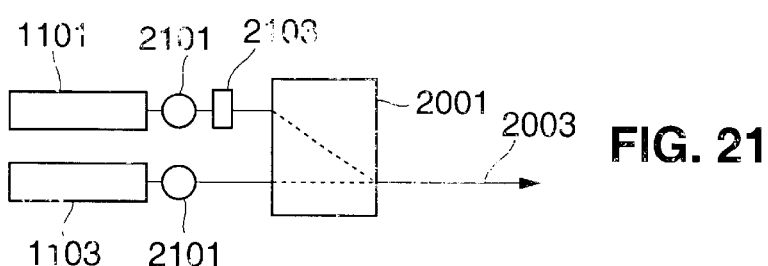
FIG. 21 is an orthogonal view of the beam combining elements of the embodiment illustrated in FIG. 20.

FIG. 20 is an illustration of an alternate embodiment of the system shown in FIG. 16, this embodiment providing a means of further reducing the size of the optical system through the use of a different array output combining technique. FIG. 21 is a cross-section of the beam combining aspects of this embodiment. In this embodiment arrays 1101 and 1103 are stacked one on top of the other. In order to optimize the size of the system as well as its robustness, preferably the two arrays are bonded together. The output of each array is substantially collimated by passing it through a lens element 2101, typically either a microlens array or a cylindrical rod lens. The collimated output of one of the arrays, e.g., upper array 1101 in FIG. 21, then passes through a half wave plate 2103 in order to rotate the output polarization. A birefringent crystal 2001, e.g., a calcite crystal, is then used to combine the output from the two arrays into a single plane 2003. Once the beams have been combined, any of the optical configurations illustrated in FIGS. 16–19 can be used to achieve the desired output wavelength spectrum.

Figure 22:
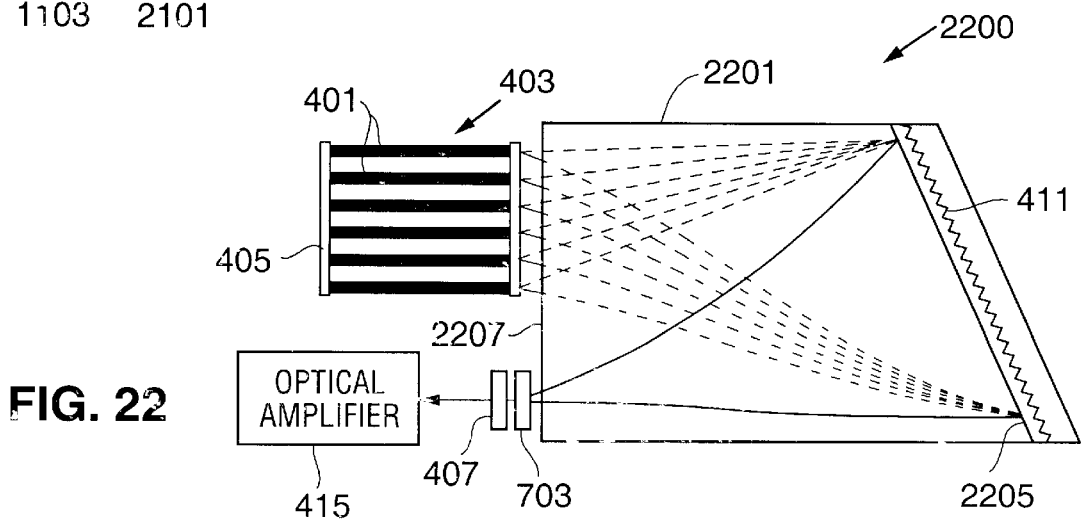
FIG. 22 schematically illustrates an optical amplifier coupled to an IBC laser utilizing a GRIN lens.

FIG. 22 illustrates an alternate embodiment of the invention. Laser system 2200 is similar to system 700. In this embodiment, however, collimating lens 409 is replaced with a gradient index or GRIN lens 2201.

GRIN lens 2201 is approximately a ¼ pitch GRIN lens with diffraction grating 411 bonded to an end face 2205 of lens 2201 using an index matching, optically transparent adhesive. Alternately, diffraction grating 411 can be fabricated directly onto surface 2205 of GRIN lens 2201 using any of a variety of known techniques.

In a manner similar to the previous embodiments, due to the combination of GRIN lens 2201 and reflective diffraction grating 411, each gain element 401 of array 403 oscillates within its own cavity, the wavelength of which is defined by the diffraction grating, and utilizes the same output coupler, i.e., output coupler 407. As in the previous embodiments, spatial filter 703 can be interposed between output coupler 407 and the diffraction grating. Lastly, embodiments of the invention which utilize GRIN lens 2201 can also be configured to utilize external optical element 413 to further condition the output beam.

It is understood that both array 403 and output coupler 407 can be bonded directly to end face 2207 of GRIN lens 2201, thereby providing a more robust laser system.

Figure 23:
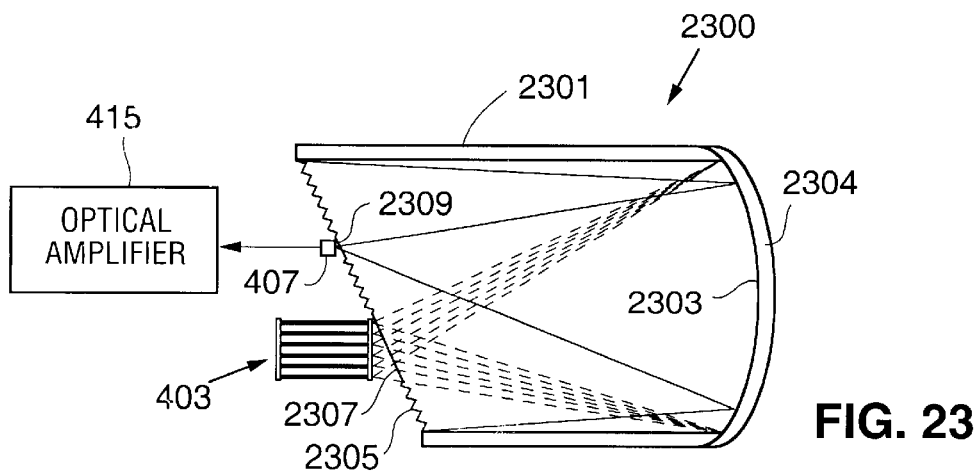
FIG. 23 schematically illustrates an optical amplifier coupled to an IBC laser utilizing a multi-element array and a monolithic cavity design.

FIG. 23 is an illustration of another alternate embodiment of the invention. As in system 2200, system 2300 is designed to utilize a single output coupler 407 for each element 401 of an array 403 of gain elements. As in previous embodiments, output coupler 407 can be directly coupled to optical amplifier 415. However, as opposed to GRIN lens 2201, system 2300 uses a single optic 2301 of uniform index. A shaped back surface 2303 of optic 2301 is coated with a highly reflective optical coating 2304, designed for the wavelengths of interest. In this embodiment a reflective diffraction grating 2305 is coupled to the front surface of optic 2301, grating 2305 including an entrance aperture 2307 for array 403 and an output aperture 2309 for output coupler 407. Preferably output coupler 407 is deposited directly onto the front surface of optic 2301 at aperture 2309. Preferably the front facets of array elements 401 and entrance aperture 2307 are AR coated to minimize optical losses. More preferably, array 403 is bonded directly to entrance aperture 2307, thus providing an extremely robust optical system.

As illustrated in FIG. 23, reflector 2304 on curved surface 2303 first directs the light from each array element 401 onto reflective grating 2305, and then focuses the light reflected by grating 2305 onto output coupler 407. Preferably the light from array elements 401 is substantially collimated by reflective surface 2304 onto the diffraction grating.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A fiber optic network subsystem comprising:
   a Raman amplifier; and
   a pump source optically coupled to said Raman amplifier, said pump source comprising:
      a first laser gain element array comprised of a first plurality of laser gain elements;
      a first collimating optical element, wherein emissions from said first plurality of laser gain elements are substantially collimated by said first collimating optical element, and wherein said first collimating optical element is selected from the group of collimating optical elements consisting of reflective collimating optical elements and transmissive collimating optical elements;
      a diffraction grating, wherein said first collimated emissions impinge on said diffraction grating; and
      an output coupler, said output coupler outputting a single output beam.

2. A fiber optic network subsystem comprising:
   a Raman amplifier; and
   a pump source optically coupled to said Raman amplifier, wherein a bandwidth corresponding to said pump source is greater than 10 nanometers, said pump source comprising:
      a first laser gain element array comprised of a first plurality of laser gain elements;
      a first collimating optical element, wherein emissions from said first plurality of laser gain elements are substantially collimated by said first collimating optical element;
      a diffraction grating, wherein said first collimated emissions impinge on said diffraction grating; and
      an output coupler, said output coupler outputting a single output beam.

3. A fiber optic network subsystem comprising:
   a Raman amplifier, wherein a gain of said Raman amplifier is within ±1.0 dB over a corresponding bandwidth of at least 25 nanometers; and
   a pump source optically coupled to said Raman amplifier, wherein a bandwidth corresponding to said pump source is greater than 10 nanometers, said pump source comprising:
      a first laser gain element array comprised of a first plurality of laser gain elements;
      a first collimating optical element, wherein emissions from said first plurality of laser gain elements are substantially collimated by said first collimating optical element;
      a diffraction grating, wherein said first collimated emissions impinge on said diffraction grating; and
      an output coupler, said output coupler outputting a single output beam.

4. The fiber optic network subsystem of claim 1, wherein said Raman amplifier is fabricated from a material selected from the group of materials consisting of silica based fibers, fluoride based fibers, tellurite based fibers, germinate based fibers, and ZLAN fibers.

5. The fiber optic network subsystem of claim 1, wherein said first laser gain element array is selected from the group of arrays consisting of semiconductor diodde laser arrays, side pumped solid state laser materials, end pumped solid state laser materials, and fiber laser arrays.

6. A fiber optic network subsystem comprising:
   a Raman amplifier; and
   a pump source optically coupled to said Raman amplifier, said pump source comprising:
      a first laser gain element array comprised of a first plurality of laser gain elements, wherein said first laser gain element array is comprised of a plurality of index guided arrays, each of said plurality of index guided arrays having a distinct center wavelength;
      a first collimating optical element, wherein emissions from said first plurality of laser gain elements are substantially collimated by said first collimating optical element;
      a diffraction grating, wherein said first collimated emissions impinge on said diffraction grating; and
      an output coupler, said output coupler outputting a single output beam.

7. A fiber optic network subsystem comprising:
   a Raman amplifier; and
   a pump source optically coupled to said Raman amplifier, said pump source comprising:
      a first laser gain element array comprised of a first plurality of laser gain elements, wherein said first laser gain element array is comprised of a single array with a laterally varying quantum well thickness;
      a first collimating optical element, wherein emissions from said first plurality of laser gain elements are substantially collimated by said first collimating optical element;
      a diffraction grating, wherein said first collimated emissions impinge on said diffraction grating; and
      an output coupler, said output coupler outputting a single output beam.

8. A fiber optic network subsystem comprising:
   a Raman amplifier; and
   a pump source optically coupled to said Raman amplifier, said pump source comprising:
      a first laser gain element array comprised of a first plurality of laser gain elements, wherein said first laser gain element array is comprised of a single array with a laterally varying epitaxy;

a first collimating optical element, wherein emissions from said first plurality of laser gain elements are substantially collimated by said first collimating optical element;

a diffraction grating, wherein said first collimated emissions impinge on said diffraction grating; and an output coupler, said output coupler outputting a single output beam.

9. The fiber optic network subsystem of claim 1, wherein said diffraction grating is selected from the group of diffraction gratings consisting of reflective diffraction gratings and transmissive diffraction gratings.

10. The fiber optic network subsystem of claim 1, said pump source further comprising a spatial filter interposed between said diffraction grating and said output coupler.

11. A fiber optic network subsystem comprising:

a Raman amplifier; and a pump source optically coupled to said Raman amplifier, said pump source further comprising:

a first laser gain element array comprised of a first plurality of laser gain elements;

a first collimating optical element, wherein emissions from said first plurality of laser gain elements are substantially collimated by said first collimating optical element;

a first optical element interposed between said first laser gain element array and said first collimating optical element, said first optical element reducing divergence in emissions from said first plurality of laser gain elements;

a diffraction grating, wherein said first collimated emissions impinge on said diffraction grating; and an output coupler, said output coupler outputting a single output beam.

12. The fiber optic network subsystem of claim 11, wherein said first optical element is comprised of a cylindrical lens.

13. The fiber optic network subsystem of claim 12, said first optical element further comprising a plurality of cylindrical lens elements, wherein a center-to-center spacing of said plurality of cylindrical lens elements matches a gain element spacing.

14. The fiber optic network subsystem of claim 11, wherein said first optical element is comprised of a plurality of lens elements, wherein a center-to-center spacing of said plurality of lens elements matches a gain element spacing.

15. The fiber optic network subsystem of claim 14, wherein said plurality of lens elements are aspheric lens elements.

16. The fiber optic network subsystem of claim 1, said pump source further comprising:

a second laser gain element array comprised of a second plurality of laser gain elements; and a second collimating optical element, wherein emissions from said second plurality of laser gain elements are substantially collimated by said second collimating optical element, and wherein said first and second collimated emissions overlap on said diffraction grating.

17. A fiber optic network subsystem comprising:

a Raman amplifier; and a pump source optically coupled to said Raman amplifier, wherein a bandwidth corresponding to said pump source is greater than 10 nanometers, said pump source comprising:

a first laser gain element array comprised of a first plurality of laser gain elements, wherein said first plurality of laser gain elements are unevenly spaced, said uneven spacing altering a spectral shape corresponding to said pump source;

a first collimating optical element, wherein emissions from said first plurality of laser gain elements are substantially collimated by said first collimating optical element;

a diffraction grating, wherein said first collimated emissions impinge on said diffraction grating; and an output coupler, said output coupler outputting a single output beam.

18. The fiber optic network subsystem of claim 17, wherein a gain spectral shape of said Raman amplifier is flattened by said uneven spacing of said first plurality of laser gain elements.

19. A fiber optic network subsystem comprising:

a Raman amplifier; and a pump source optically coupled to said Raman amplifier, wherein a bandwidth corresponding to said pump source is greater than 10 nanometers, said pump source comprising:

a first laser gain element array comprised of a first plurality of laser gain elements, wherein said first plurality of laser gain elements operate at different power levels, altering a spectral shape corresponding to said pump source;

a first collimating optical element, wherein emissions from said first plurality of laser gain elements are substantially collimated by said first collimating optical element;

a diffraction grating, wherein said first collimated emissions impinge on said diffraction grating; and an output coupler, said output coupler outputting a single output beam.

20. The fiber optic network subsystem of claim 19, wherein a gain spectral shape of said Raman amplifier is flattened by said different power levels of said first plurality of laser gain elements.

21. A fiber optic network subsystem comprising:

a Raman amplifier; and a pump source optically coupled to said Raman amplifier, said pump source comprising:

a first laser gain element array comprised of a first plurality of laser gain elements;

a second laser gain element array comprised of a second plurality of laser gain elements;

a beam combining element, said beam combining element combining a first plurality of emissions from said first plurality of laser gain elements with a second plurality of emissions from said second plurality of laser gain elements to form a plane of combined emissions;

a wave plate interposed between said first laser gain element array and said beam combining element;

a collimating optical element, said collimating optical element collimating said combined emissions;

a diffraction grating, wherein said collimated combined emissions are directed onto said diffraction grating; and an output coupler, said output coupler outputting a single output beam.

22. The fiber optic network subsystem of claim 21, wherein a bandwidth corresponding to said pump source is greater than 10 nanometers.

23. The fiber optic network subsystem of claim 21, wherein a gain of said Raman amplifier is within ±1.0 dB over a corresponding bandwidth of 25 nanometers.

24. The fiber optic network subsystem of claim 21, wherein said Raman amplifier is fabricated from a material selected from the group of materials consisting of silica based fibers, fluoride based fibers, tellurite based fibers, germinate based fibers, and ZBLAN fibers.

25. The fiber optic network subsystem of claim 21, wherein said beam combining element is a thin film polarizer.

26. The fiber optic network subsystem of claim 21, said pump source further comprising:
 a first lens element proximate to said first laser gain element array, said first lens element reducing divergence of said first plurality of emissions of said first laser gain element array along at least a first axis; and
 a second lens element proximate to said second laser gain element array, said second lens element reducing divergence of emissions of said second laser gain element array along at least said first axis.

27. The fiber optic network subsystem of claim 26, wherein said first lens element is a first cylindrical lens and said second lens element is a second cylindrical lens.

28. The fiber optic network subsystem of claim 21, wherein said beam combining element is a birefringent crystal.

29. The fiber optic network subsystem of claim 28, said pump source further comprising:
 a first lens element proximate to said first laser gain element array, said first lens element reducing divergence of said first plurality of emissions of said first laser gain element array along at least a first axis; and
 a second lens element proximate to said second laser gain element array, said second lens element reducing divergence of emissions of said second laser gain element array along at least said first axis.

30. The fiber optic network subsystem of claim 29, wherein said first lens element is a first cylindrical lens and said second lens element is a second cylindrical lens.

31. The fiber optic network subsystem of claim 21, wherein said first laser gain element array is selected from the group of arrays consisting of semiconductor diode laser arrays, side pumped solid state laser materials, end pumped solid state laser materials, and fiber laser arrays, and wherein said second laser gain element array is selected from the group of arrays consisting of semiconductor diode laser arrays, side pumped solid state laser materials, end pumped solid state laser materials, and fiber laser arrays.

32. The fiber optic network subsystem of claim 21, wherein said first laser gain element array is comprised of a first plurality of index guided arrays, each of said first plurality of index guided arrays having a distinct center wavelength, and wherein said second laser gain element array is comprised of a second plurality of index guided arrays, each of said second plurality of index guided arrays having a distinct center wavelength.

33. The fiber optic network subsystem of claim 21, wherein said first laser gain element array is comprised of a first single array with a laterally varying quantum well thickness, and wherein said second laser gain element array is comprised of a second single array with a laterally varying quantum well thickness.

34. The fiber optic network subsystem of claim 21, wherein said first laser gain element array is comprised of a first single array with a laterally varying epitaxy, and wherein said second laser gain element array is comprised of a second single array with a laterally varying epitaxy.

35. The fiber optic network subsystem of claim 21, wherein said collimating optical element is selected from the group of collimating optical elements consisting of reflective collimating optical elements and transmissive collimating optical elements.

36. The fiber optic network subsystem of claim 21, wherein said diffraction grating is selected from the group of diffraction gratings consisting of reflective diffraction gratings and transmissive diffraction gratings.

37. The fiber optic network subsystem of claim 21, said pump source further comprising a spatial filter interposed between said diffraction grating and said output coupler.

38. The fiber optic network subsystem of claim 21, wherein said first plurality of laser gain elements are unevenly spaced, said uneven spacing altering a spectral shape corresponding to said pump source.

39. The fiber optic network subsystem of claim 38, wherein a gain spectral shape of said Raman amplifier is flattened by said uneven spacing of said first plurality of laser gain elements.

40. The fiber optic network subsystem of claim 21, wherein said first plurality of laser gain elements operate at different power levels, altering a spectral shape corresponding to said pump source.

41. The fiber optic network subsystem of claim 40, wherein a gain spectral shape of said Raman amplifier is flattened by said different power levels of said first plurality of laser gain elements.

42. A fiber optic network subsystem comprising:
 a Raman amplifier; and
 a pump source optically coupled to said Raman amplifier, said pump source comprising:
  a laser gain element array comprised of a plurality of laser gain elements;
  a GRIN lens, wherein emissions from said plurality of laser gain elements pass through said GRIN lens;
  a reflective diffraction grating, wherein emissions passing through said GRIN lens from said plurality of laser gain elements overlap on said diffraction grating and are reflected by said diffraction grating back through said GRIN lens; and
  an output coupler, wherein emissions from said plurality of laser gain elements reflected by said diffraction grating are focused onto said output coupler, said output coupler outputting a single output beam.

43. The fiber optic network subsystem of claim 42, wherein a bandwidth corresponding to said pump source is greater than 10 nanometers.

44. The fiber optic network subsystem of claim 42, wherein a gain of said Raman amplifier is within ±1.0 dB over a corresponding bandwidth of 25 nanometers.

45. The fiber optic network subsystem of claim 42, wherein said Raman amplifier is fabricated from a material selected from the group of materials consisting of silica based fibers, fluoride based fibers, tellurite based fibers, germinate based fibers, and ZBLAN fibers.

46. The fiber optic network subsystem of claim 42, wherein said GRIN lens is a substantially ¼ pitch GRIN lens.

47. The fiber optic network subsystem of claim 42, wherein said laser gain element array is selected from the group of arrays consisting of semiconductor diode laser arrays, side pumped solid state laser materials, end pumped solid state laser materials, and fiber laser arrays.

48. The fiber optic network subsystem of claim 42, wherein said laser gain element array is comprised of a plurality of index guided arrays, each of said plurality of index guided arrays having a distinct center wavelength.

49. The fiber optic network subsystem of claim 42, wherein said laser gain element array is comprised of a single array with a laterally varying quantum well thickness.

50. The fiber optic network subsystem of claim 42, wherein said laser gain element array is comprised of a single array with a laterally varying epitaxy.

51. The fiber optic network subsystem of claim 42, said pump source further comprising a spatial filter interposed between said diffraction grating and said output coupler.

52. The fiber optic network subsystem of claim 42, wherein said first plurality of laser gain elements are unevenly spaced, said uneven spacing altering a spectral shape corresponding to said pump source.

53. The fiber optic network subsystem of claim 52, wherein a gain spectral shape of said Raman amplifier is flattened by said uneven spacing of said first plurality of laser gain elements.

54. The fiber optic network subsystem of claim 42, wherein said first plurality of laser gain elements operate at different power levels, altering a spectral shape corresponding to said pump source.

55. The fiber optic network subsystem of claim 54, wherein a gain spectral shape of said Raman amplifier is flattened by said different power levels of said first plurality of laser gain elements.

56. A fiber optic network subsystem comprising:

a Raman amplifier; and a pump source optically coupled to said Raman amplifier, said pump source comprising:

a laser gain element array comprised of a plurality of laser gain elements;

an optical element of a uniform optical index, wherein emissions from said plurality of laser gain elements pass through an entrance aperture on a leading surface of said optical element;

a reflective coating coupled to a shaped back surface of said optical element, wherein said reflective coating on said shaped back surface substantially collimates said emissions from said plurality of laser gain elements;

a reflective diffraction grating coupled to said leading surface of said optical element, wherein said substantially collimated emissions from said plurality of laser gain elements are reflected by said diffraction grating back through said optical element, wherein said reflective coating on said shaped back surface substantially focuses said emissions from said plurality of laser gain elements reflected by said diffraction grating, wherein said focussed emissions pass through an exit aperture on said leading surface of said optical element; and an output coupler proximate to said exit aperture, wherein emissions from said plurality of laser gain elements focussed by said reflective coating on said shaped back surface are focused onto said output coupler, said output coupler outputting a single output beam.

57. The fiber optic network subsystem of claim 56, wherein a bandwidth corresponding to said pump source is greater than 10 nanometers.

58. The fiber optic network subsystem of claim 56, wherein a gain of said Raman amplifier is within ±1.0 dB over a corresponding bandwidth of 25 nanometers.

59. The fiber optic network subsystem of claim 56, wherein said Raman amplifier is fabricated from a material selected from the group of materials consisting of silica based fibers, fluoride based fibers, tellurite based fibers, germinate based fibers, and ZBLAN fibers.

60. The fiber optic network subsystem of claim 56, wherein said laser gain element array is selected from the group of arrays consisting of semiconductor diode laser arrays, side pumped solid state laser materials, end pumped solid state laser materials, and fiber laser arrays.

61. The fiber optic network subsystem of claim 56, wherein said laser gain element array is comprised of a plurality of index guided arrays, each of said plurality of index guided arrays having a distinct center wavelength.

62. The fiber optic network subsystem of claim 56, wherein said laser gain element array is comprised of a single array with a laterally varying quantum well thickness.

63. The fiber optic network subsystem of claim 56, wherein said laser gain element array is comprised of a single array with a laterally varying epitaxy.

64. The fiber optic network subsystem of claim 56, said pump source further comprising a spatial filter interposed between said diffraction grating and said output coupler.

65. The fiber optic network subsystem of claim 56, wherein said first plurality of laser gain elements are unevenly spaced, said uneven spacing altering a spectral shape corresponding to said pump source.

66. The fiber optic network subsystem of claim 65, wherein a gain spectral shape of said Raman amplifier is flattened by said uneven spacing of said first plurality of laser gain elements.

67. The fiber optic network subsystem of claim 56, wherein said first plurality of laser gain elements operate at different power levels, altering a spectral shape corresponding to said pump source.

68. The fiber optic network subsystem of claim 67, wherein a gain spectral shape of said Raman amplifier is flattened by said different power levels of said first plurality of laser gain elements.

69. A method of pumping a Raman amplifier to achieve a system bandwidth with a corresponding system gain spectrum, the method comprising the steps of:

selecting a material for said Raman amplifier, said material having a Raman gain spectrum;

deconvoluting said Raman gain spectrum from said system gain spectrum to determine a pump emission spectrum;

incoherently combining a plurality of single mode diode emitters within a single resonator cavity to form a single output beam with said pump emission spectrum; and propagating said single output beam through said Raman amplifier.

70. The method of claim 69, wherein a bandwidth corresponding to said single output beam is greater than 10 nanometers.

71. The method of claim 69, wherein said propagating step is in the same direction as a signal wave passing through said Raman amplifier.

* * * * *